UNITED STATES PATENT OFFICE.

THOMAS C. MEADOWS, OF NEW YORK, MATHIAS HAUBER, JR., OF WEST HAVERSTRAW, AND HARRY W. CHARLTON, OF NEW YORK, N. Y.

PROCESS OF OBTAINING COMBINED POTASSIUM FROM GREENSAND.

1,327,164.   Specification of Letters Patent.   Patented Jan. 6, 1920.

No Drawing.   Application filed December 6, 1918.   Serial No. 265,594.

*To all whom it may concern:*

Be it known that we, THOMAS C. MEADOWS, MATHIAS HAUBER, Jr., both citizens of the United States, and HARRY WILLIAMS CHARLTON, a citizen of Canada, said MEADOWS and the said CHARLTON each residing at New York city, county of New York, and State of New York, and the said HAUBER residing at West Haverstraw, Rockland county, State of New York, have invented certain new and useful Improvements in Process of Obtaining Combined Potassium from Greensand; and we do hereby declare the following to be a full, clear, and exact description of the invention, such as will enable others skilled in the art to which it appertains to make and use the same.

This invention relates to the extraction of combined potassium from green sand, and has for its object to provide a process which will be more efficient in action, and less costly to carry out than those heretofore proposed.

With these and other objects in view the invention consists in the novel steps and combinations of steps constituting the process, all as will be more fully hereinafter disclosed and particularly pointed out in the claims.

In order that the precise invention may be more clearly understood it is said:—It has been heretofore proposed to digest a mixture of lime and green sand at super-atmospheric pressures, and to thus dissolve out the potassium present. But in practice, it is found when the potassium hydrate solution thus obtained reaches a concentration of say 2% the reaction of the lime on the green sand either slows down to such an extent, or a reversion of some kind sets in, so that it is not economical to attempt to carry the concentration higher.

The commercial inability to thus make a more concentrated solution of potassium hydrate in the digester necessitates the evaporation of a much larger excess of water than would be the case if the concentration of said digester solution could be commercially carried up to say 4% or 5% potassium hydrate or higher. And, of course, the fuel costs and other expenses attending the evaporation of this excess of water, amount to a considerable item in large scale operations.

Accordingly, one of the main objects of this invention, when more specifically stated, is to get rid of this item of expense by getting the combined potassium, present in green sand, into a more concentrated solution, even though it may be recovered as a chlorid instead of in the form of a hydrate.

Another object of the invention is to produce a valuable sludge residue which may be sold for various purposes, and thus lessen the cost of the process as a whole.

In carrying out this invention, one may take for example say four or five parts by weight of lime and five parts by weight of green sand and thoroughly mix the same together. One may then take say sixteen or twenty parts by weight of water, or four times as much water as there is lime, and add thereto sufficient calcium chlorid to react with all the potassium present in the green sand. The solution of calcium chlorid thus produced is together with the green sand and lime mixture subjected to a digesting action at a pressure above 190 pounds to the square inch, and preferably as high as say, 220 pounds or 225 pounds, or higher, and at a corresponding temperature for say one or two hours, or until a substantial percentage of the potassium present has been dissolved out in the form of a chlorid. The resulting potassium chlorid solution which will contain more than 2% of potassium chlorid is next separated from the insoluble residue or sludge, as by filtration, whereupon the filter cake may be washed, and the wash water added to the original potassium chlorid solution.

Another, or second mixture of green sand and lime is now prepared, but, instead of taking water as in the first instance for digestion purposes, the wash water from the previous digestion mixed with a sufficient quantity of the potassium chlorid solution obtained from said previous digestion, to make up the requisite quantity of water is employed. To this said mixture of wash water and chlorid solution is now added sufficient calcium chlorid to combine with all the potassium present in the green sand as in the first instance and the digestion is carried out with the second mixture of lime and green sand as before, and preferably for a time sufficient to form a solution containing more than say 3% of potassium chlorid.

This procedure is repeated by making up new mixtures of green sand and lime and employing mixtures of wash water and potassium-chlorid solutions with calcium chlorid added thereto, until a concentration of potassium chlorid in the digestion liquor amounting to say 4 per cent., 5 per cent., 6% or 8% or higher is reached, or until the volume of water necessary to thoroughly wash the filter cake is sufficient in itself to make up the succeeding charge.

By proceeding as above outlined we have discovered it to be a fact that we are enabled to obtain a solution of potassium chlorid very much more concentrated as regards combined potassium than it is possible to obtain when making a potassium hydrate solution, for the chlorid solutions do not seem to be limited in their strengths by the relatively very great dilutions that govern the hydrate solutions.

By reason of this fact, we are enabled in large scale operations to very greatly reduce the evaporating costs. We have further discovered that after a pressure of say 190 pounds to the square inch has been reached in the digester, the insoluble residue or sludge undergoes a profound change. Instead of being a mixture of green sand, lime and other material as it is at lower pressures, it becomes a homogeneous mud, which has a variety of commercial uses. One of them is that it can be used as a coloring material for brick and plastics. That is to say, upon calcining this residue it takes on an ornamental color and it can be used after the manner of a pigment to be mixed with cementing materials. Or it may be molded into shapes, and then heated, when it acts as a cement of color would act, or it may be even used as a cementing or binding material without calcining by mixing with sand, etc. We have further found that this material as well as the yield of combined potassium is greatly improved by employing pressures up to 225 pounds or higher instead of in the neighborhood of 190 or 200 pounds.

It will now be clear that by operating in the manner described and at pressures exceeding 190 pounds to the square inch we are not only enabled to avoid the very great dilutions that were necessary in making potassium hydrate solutions, and thus avoid the excessive costs of subsequent evaporations to get out the combined potassium, but we in this invention, by operating at pressures above 190 pounds to the square inch are enabled to produce a valuable cementing material of uniform character which may be applied to a variety of uses.

It is possible that these remarkable results are due, in part, to the action of the nascent calcium on the green sand after the decomposition of the calcium chlorid molecule and under the high pressures employed.

It is obvious that those skilled in the art may vary the details of the process without departing from the spirit of the invention and therefore, we do not desire to be limited to the above disclosure except as may be required by the claims.

What we claim is:—

1. The process of extracting potassium chlorid from green sand which consists in providing a mixture of green sand and lime, digesting said mixture at a pressure exceeding 200 pounds to the square inch, and at a corresponding temperature, with water containing in solution sufficient calcium chlorid to react with substantially all the potassium present in the green sand; and continuing the first digestion until a solution containing more than 2% potassium chlorid and a valuable sludge material is formed, substantially as described.

2. The process of extracting potassium chlorid from green sand which consists in digesting at a pressure exceeding 200 pounds to the square inch and at a corresponding temperature a mixture of green sand and lime with a weight of water of substantially four times the weight of lime employed, said water also containing in solution potassium chlorid as well as sufficient calcium chlorid to react with substantially all the potassium present in the green sand; continuing the digestion until a solution containing more than 3% of potassium chlorid is had; and separating the potassium chlorid thus formed from the insoluble sludge produced, substantially as described.

3. The process of extracting potassium chlorid from green sand which consists in digesting a mixture of green sand, lime, water and calcium chlorid, at a pressure exceeding 200 pounds to the square inch and at a corresponding temperature and until a solution containing more than 2% of potassium chlorid is obtained; washing the insoluble residue; using the wash water with an added quantity of calcium chlorid to digest another mixture of green sand and lime, there being present sufficient calcium chlorid to react with substantially all the potassium present in the green sand; and continuing said second digestion at a pressure exceeding 200 pounds to the square inch until a solution containing more than 3% of potassium chlorid is obtained, substantially as described.

4. The process of extracting potassium chlorid from green sand which consists in preparing a mixture of green sand lime and a water solution containing more than 2% of potassium chlorid; adding to said mixture sufficient calcium chlorid to react with substantially all the potassium present in the green sand; digesting the charge thus produced at a pressure exceeding 200 pounds to the square inch and at a corresponding temperature until a solution containing more than 4% potassium chlorid is obtained, and separating said solution from the insoluble residue, substantially as described.

5. The process of extracting potassium chlorid from green sand which consists in preparing a mixture of green sand, lime and a water solution containing more than 2% of potassium chlorid; adding to said mixture sufficient calcium chlorid to react with substantially all the potassium present in the green sand; digesting the charge thus produced at a pressure exceeding 220 pounds to the square inch and at a corresponding temperature until a solution containing more than 3% potassium chlorid is obtained; and separating said solution from the insoluble residue, substantially as described.

In testimony whereof we affix our signatures hereto.

THOMAS C. MEADOWS.
MATHIAS HAUBER, Jr.
HARRY W. CHARLTON.